United States Patent
Chapman et al.

(10) Patent No.: US 11,653,592 B2
(45) Date of Patent: May 23, 2023

(54) LIQUID FERTILIZER COMPOSITION CONTAINING NANO-BUBBLES AND METHOD OF USE THEREOF

(71) Applicant: Summit Nutrients, LLC, Belle Glade, FL (US)

(72) Inventors: John Patrick Chapman, Fairhope, AL (US); Peter Grosso, Gulf Shores, AL (US); John Paul Chapman, Foley, AL (US)

(*) Notice: Subject to any disclaimer, the term of this patent is extended or adjusted under 35 U.S.C. 154(b) by 263 days.

(21) Appl. No.: 17/080,531

(22) Filed: Oct. 26, 2020

(65) Prior Publication Data

US 2022/0124967 A1    Apr. 28, 2022

(51) Int. Cl.
 *A01C 21/00*    (2006.01)
 *C05G 5/23*    (2020.01)

(52) U.S. Cl.
 CPC ............. *A01C 21/00* (2013.01); *C05G 5/23* (2020.02)

(58) Field of Classification Search
 CPC .......... A01C 21/00; A01C 21/002; C05G 5/23
 See application file for complete search history.

(56) References Cited

U.S. PATENT DOCUMENTS

| | | | | |
|---|---|---|---|---|
| 8,186,653 B2* | 5/2012 | Tsuji | ..................... | B01F 25/53 261/92 |
| 8,317,165 B2* | 11/2012 | Yamasaki | ............. | B01F 23/231 261/26 |
| 8,500,104 B2* | 8/2013 | Spears | ..................... | C02F 3/02 261/119.1 |
| 8,726,918 B2* | 5/2014 | Watanabe | ................. | B08B 3/10 134/102.1 |
| 8,919,747 B2* | 12/2014 | Anzai | ............... | B01F 23/23231 261/122.1 |
| 8,974,770 B2* | 3/2015 | Chang | ................... | A61K 49/223 427/2.12 |
| 9,364,438 B2* | 6/2016 | Murata | ................. | A61K 9/1688 |
| 9,512,041 B2* | 12/2016 | McEvoy | ............. | B01D 65/106 |
| 10,591,231 B2* | 3/2020 | Russell | ................... | B01F 25/32 |
| 11,179,684 B2* | 11/2021 | Zhang | ............... | B01F 23/23123 |
| 2014/0191425 A1* | 7/2014 | Yano | ................. | B01F 23/23105 261/124 |
| 2014/0238936 A1* | 8/2014 | Fazel | ................... | B01D 61/025 210/636 |

(Continued)

FOREIGN PATENT DOCUMENTS

| | | | |
|---|---|---|---|
| KR | 2010037252 A | * 4/2010 | |
| WO | 2017127636 A1 | 7/2017 | |
| WO | WO-2019230775 A1 | * 12/2019 | ............. A01G 25/02 |

OTHER PUBLICATIONS

Google Translation of W02019230775, retrieved on Sep. 6, 2022 (Year: 2019).*

*Primary Examiner* — Monica L Perry
*Assistant Examiner* — Aaron M Rodziwicz

(57) ABSTRACT

Liquid fertilizer compositions and methods of making and using the compositions for fertilizing crops are provided. A liquid fertilizer formulated to enhance plant growth is infused with nano-bubbles that increase the efficacy of the liquid fertilizer. The liquid fertilizer is mixed and homogenized before flowing the liquid fertilizer through a nano-bubble generator. The liquid fertilizing composition infused with nano-bubbles may be applied to soil in the same manner as standard liquid fertilizers to further promote plant growth.

20 Claims, 1 Drawing Sheet

(56) References Cited

U.S. PATENT DOCUMENTS

| | | | |
|---|---|---|---|
| 2016/0023187 A1* | 1/2016 | Hedlund | B01J 29/084 |
| | | | 502/64 |
| 2016/0066760 A1* | 3/2016 | Citsay | B08B 3/04 |
| | | | 205/628 |
| 2019/0060223 A1* | 2/2019 | Yaniv | B01F 23/23121 |

* cited by examiner

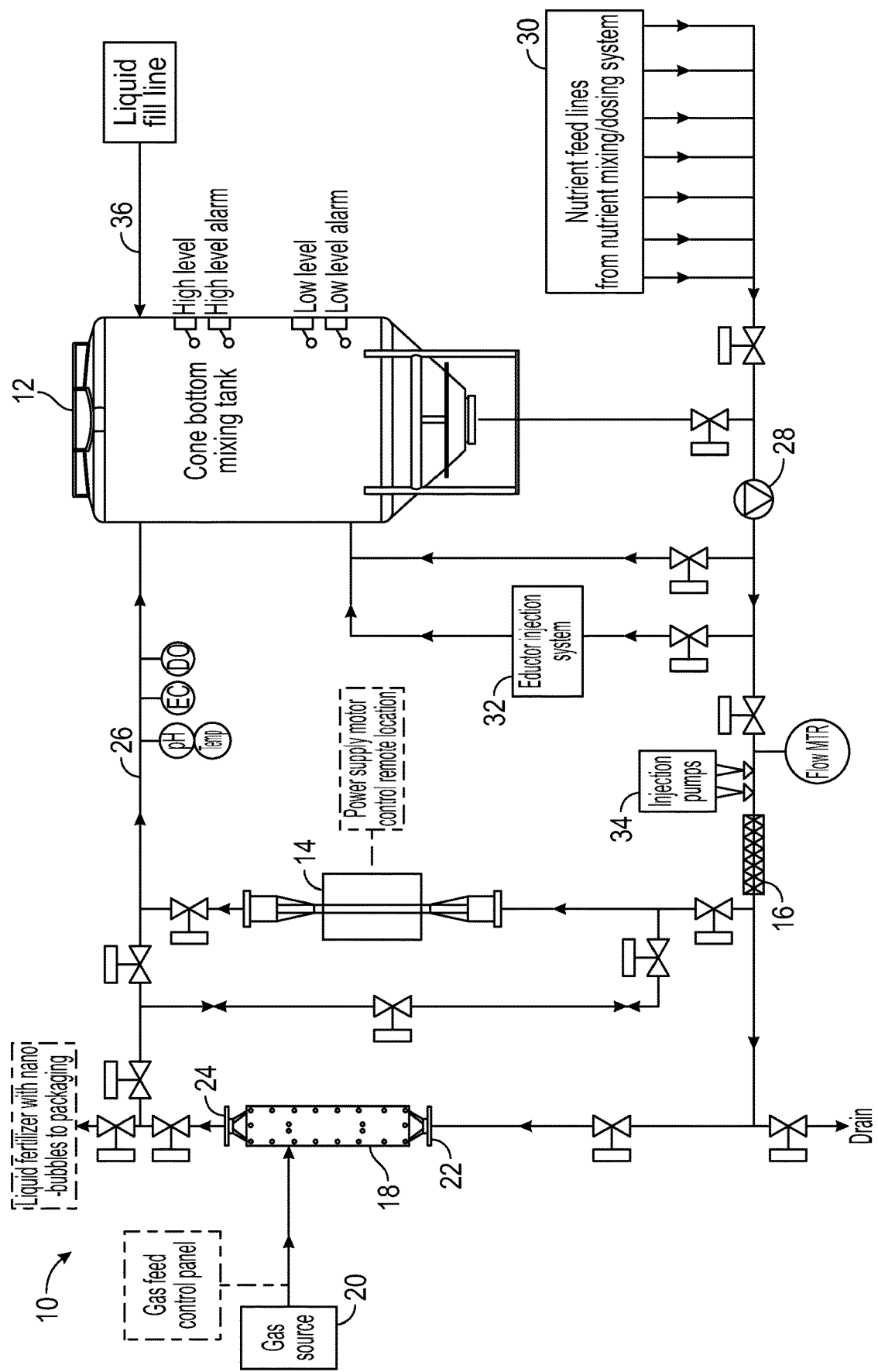

LIQUID FERTILIZER COMPOSITION CONTAINING NANO-BUBBLES AND METHOD OF USE THEREOF

FIELD OF THE DISCLOSURE

The subject matter of the present disclosure refers generally to liquid fertilizer compositions and methods of making and using such compositions for fertilizing crops.

BACKGROUND

A variety of different types of liquid fertilizers are utilized for fertilizing crops. These fertilizers may contain various types of plant nutrients or fertilizing compounds, or other types of compounds that enhance plant growth through uptake of nutrients by plant roots, by improving soil quality, or by other mechanisms of growth enhancement. Such fertilizers are generally applied to the soil in which crops grow and allowed to permeate the soil so that the plant roots take up the nutrients or other growth-enhancing compounds contained in the liquid. The liquid fertilizer may be applied to the soil surface or in a subsurface application. Liquid fertilizers generally supply macronutrients, including nitrogen, phosphorus, and/or potassium, to plants and may also supply micronutrients, such as copper, iron, magnesium, or zinc, or other growth-enhancing compounds. Although most industrial fertilizers are solids that are applied to soils, liquid fertilizers are commonplace and generally provide a more rapid effect and easier coverage compared to solid fertilizers. Liquid fertilizing compounds are available in a variety of forms for enhancing plant growth by different mechanisms. Such liquid formulations may include, for instance, anhydrous ammonia, aqueous solutions of ammonia, aqueous solutions of ammonium nitrate or polyphosphate, urea, or other liquid formulations that serve as soil amendments, such as humic acid, liquid lime, or liquid calcium compositions. Some of these compounds may be diluted with water to form a concentrated liquid fertilizer.

In addition to fertilizers, plants and soils need oxygen and other gases to metabolize plant nutrients, generate microbial activity, and facilitate many other processes necessary for efficient and effective plant growth. To achieve optimal results, all growing conditions should be optimized. Although known liquid fertilizers are generally beneficial, a need exists in the art for liquid fertilizers that more effectively enhance plant growth, as well as methods of making and using liquid fertilizing compositions for fertilizing crops.

SUMMARY

In one aspect, a liquid fertilizer composition is provided. The composition comprises a liquid fertilizer formulated for enhancing plant growth and having nano-bubbles dispersed within the liquid fertilizer. The liquid fertilizer may be formulated to promote plant growth by various mechanisms, such as by providing macronutrients and/or micronutrients essential for plant growth, by providing soil amendments formulated to improve the physical qualities of the soil, by providing adjuvants formulated to optimize the viscosity or surface tension of the liquid, or by other mechanisms that may enhance plant growth. The nano-bubbles preferably include molecular oxygen, which may be provided from a pure oxygen source or from compressed air, or ozone and preferably have a mean diameter of less than 500 nanometers. The liquid fertilizer composition preferably has greater than one billion nano-bubbles per milliliter of liquid fertilizer dispersed in the liquid fertilizer. The nano-bubbles are transferred into the liquid fertilizer so that the nano-bubbles are dispersed throughout the liquid carrier. Nano-bubbles are neutrally buoyant and can therefore remain suspended in the liquid fertilizer for an extended period of time after final packaging of the liquid product to allow for the product to be transported to an end user and to allow for an adequate shelf life before use.

The nano-bubbles dissolved in the liquid fertilizer composition maximize the efficacy of the fertilizer to further enhance plant growth and thus maximize crop yield. Nano-bubbles increase the efficacy and efficiency of liquid fertilizer formulations, soil amendments, adjuvants, micronutrient compositions, or other similar growth-enhancing compositions. Oxygen and other gases dispersed in the liquid fertilizer in the form of nano-bubbles help to more effectively metabolize plant nutrients, generate microbial activity, and facilitate other processes necessary for efficient and effective plant growth. Nano-bubbles also create an environment more conducive to plant nutrient uptake in plants and soils. Nano-bubbles additionally reduce the viscosity of the liquid carrier, which may contain suspended or dissolved fertilizer particles. Reducing the viscosity of the liquid carrier helps with liquid handling, fertilizer application to soils, plant uptake, and soil mobility. Thus, nano-bubbles dispersed within a liquid fertilizer may provide a variety of benefits that further enhance plant growth.

In another aspect, methods of producing a liquid fertilizer composition and of utilizing the liquid composition to fertilize crops are provided. First, a liquid fertilizer formulated for enhancing plant growth is provided. The liquid fertilizer may include a variety of different liquid formulations of growth-enhancing fertilizers in a liquid carrier so that nano-bubbles may be dissolved into the liquid. Nano-bubbles may then be transferred into the liquid fertilizer so that the nano-bubbles are dispersed throughout the liquid fertilizer. In a preferred embodiment, the nano-bubbles may include oxygen and nitrogen nano-bubbles derived form a source of compressed air. In other embodiments, the nano-bubbles transferred into the liquid fertilizer may be derived from sources of pure oxygen, ozone, or nitrogen, or may include other gases that may be beneficial to plant growth, such as ammonia, ammonium gases, or nitrate gases.

To produce the liquid fertilizer composition with nano-bubbles, the nano-bubbles are preferably transferred into the liquid as a final step in the process before final packaging of the liquid fertilizer for transport and sale to an end user. Transferring the nano-bubbles is preferably the final step so that other steps in the process do not cause some of the nano-bubbles dissolved in the liquid to come out of solution and thus decrease the concentration of nano-bubbles, which would reduce the efficacy of the liquid fertilizer composition. The liquid fertilizer to which the nano-bubbles are to be added may include any liquid substance that directly acts as a fertilizer or may be formulated by adding any solid or additional liquid fertilizing compounds to a liquid carrier and dissolving or mixing the fertilizing compounds in the liquid carrier. After addition of liquid or solid fertilizing compounds, the liquid fertilizer is preferably run through a static mixer and a high shear pump to homogenize the liquid fertilizer solution. Once the liquid fertilizer solution is adequately mixed and homogenized, nano-bubbles may be introduced to infuse the liquid with nano-bubbles. To this end, the liquid fertilizer may be run through a nano-bubble generator before final packaging of the liquid. The production system may be designed for a single pass through the nano-bubble generator or, optionally, for multiple passes to increase the concentration of nano-bubbles in the liquid. In a preferred embodiment, the nano-bubble generator transfers nano-bubbles into the liquid fertilizer by osmosis. Alternatively, other methods of introducing nano-bubbles into a liquid may be utilized, such as high-pressure dissolution, ejectors, venturi tubes, supersonic vibration, or swirl flow technology. Once the nano-bubbles have been dissolved into and dispersed within the liquid, the liquid fertilizer containing the nano-bubbles may be applied to soil in which crops are grown in the same manner as any other liquid fertilizer. In a preferred embodiment, the liquid fertilizer is applied to the surface of the soil, but may also be applied subsurface.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWING

These and other features, aspects, and advantages of the present disclosure will become better understood with regard to the following description, appended claims, and accompanying drawing where:

FIG. 1 shows a schematic view of a system that may be utilized to produce a liquid fertilizer composition having nano-bubbles dispersed in the liquid fertilizer in accordance with the present disclosure.

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

As used herein, the term "nano-bubble" refers to a bubble having a diameter of 1,000 nanometers (nm), equal to one micron, or less. A micro-bubble is a bubble that has a diameter of larger than one micron and up to 100,000 nm. An ultrafine bubble has a diameter larger than 100,000 nm and up to 3,000,000 nm. A coarse bubble is any bubble larger than an ultrafine bubble. As used herein, the term "liquid fertilizer" refers to any liquid substance, composition, formulation, or solution that enhances or promotes plant growth in a manner beyond simple irrigation of crops with raw water that does not contain specific fertilizing additives. As such, liquid fertilizers may include any compounds that provide nutrients to plants, such as commonly used fertilizers that provide macronutrients including nitrogen, phosphorous, and/or potassium (N—P—K), that improve soil quality to enhance plant growth, such as soil amendments, or that enhance plant growth by other mechanisms, such as adjuvants that reduce the viscosity of liquid fertilizer. Thus, liquid fertilizers may include any liquid substance that acts directly as a fertilizer, or may include fertilizing compounds dissolved in a liquid carrier. For example, liquid fertilizers may include formulations such as micronutrient compounds dissolved in a liquid carrier, anhydrous ammonia, aqueous solutions of ammonia, aqueous solutions of ammonium nitrate or polyphosphate, urea, or other liquid formulations that function as soil amendments, such as humic acid, liquid lime, or liquid calcium compositions. As such, liquid fertilizers, as used herein, may include growth-enhancing compounds mixed with or dissolved in a liquid carrier. The liquid carrier may include water or have a water component, but, as used herein, a "liquid fertilizer" does not include raw water without a growth-enhancing compound added to the liquid carrier.

FIG. 1 illustrates a system 10 that may be used for the production of a liquid fertilizing composition that contains nano-bubbles dispersed within the liquid fertilizer. The system 10 preferably includes a high shear pump 14, a static mixer 16, and a nano-bubble gas generator 18. The nano-bubble generator has a liquid fertilizer inlet 22 and a liquid fertilizer outlet 24, which is the output of the final liquid fertilizing composition product containing nano-bubbles dispersed within the liquid, which is transferred directly from the nano-bubble generator 18 to final packaging of the liquid fertilizer composition for delivery to an end user. The nano-bubble generator 18 preferably transfers nano-bubbles into the liquid via osmosis and may comprise a ceramic media for gas transfer or any suitable type of semipermeable membrane. In other embodiments, the nano-bubble generator 18 may transfer nano-bubbles into the liquid by other gas injection processes, such as high-pressure dissolution, ejectors, venturi tubes, supersonic vibration, or swirl flow technology. The nano-bubble generator 18 includes a gas source 20 for supplying a gas from which nano-bubbles may be infused into the liquid fertilizer. The gas source 20 is preferably a compressed air source. In alternative embodiments, the gas source 20 may supply pure oxygen, ozone, or nitrogen, or may supply other gases such as ammonia, ammonium gases, or nitrate gases. Multiple gas sources 20 may optionally be utilized with one or more nano-bubble generators 18 to supply nano-bubbles of more than one type of gas to a single liquid fertilizer stream. In a preferred embodiment, the liquid fertilizer composition comprises a liquid fertilizer that includes at least one macronutrient, and preferably includes at least one nitrogen-based fertilizing compound, and that has dissolved oxygen nano-bubbles dispersed in the liquid.

The system 10 preferably includes a large mixing tank 12 for mixing liquid fertilizer. The mixing tank 12 has a liquid fill line 36 for adding a pre-mixed liquid fertilizer product directly to the tank 12 or a liquid carrier to which fertilizing compounds or substances will be added. The system 10 may have subsystems for adding solid or liquid fertilizing compounds to a liquid fertilizer and for mixing liquid fertilizer solutions. For instance, the system 10 may have a plurality of nutrient feed lines 30 for adding a variety of different types of plant nutrient compositions to a liquid fertilizer, depending on the specific fertilizer formulation being produced at any given time. The nutrient feed lines 30 may be utilized to add a variety of nutrients or other growth-enhancing compounds, which may include, but are not limited to, macronutrients, including compounds that supply nitrogen, phosphorus, and/or potassium, and micronutrients, such as copper sulfate pentahydrate, or other compounds that supply micronutrients such as copper, iron, magnesium, or zinc. The system 10 preferably has a circulation pump 28 for circulating liquid streams from the mixing tank 12 either back to the tank 12 or to final packaging of the liquid fertilizer for an end user. The system 10 may also include an eductor injection system 32 for injecting solid fertilizing compositions into a liquid carrier. The system 10 preferably also includes one or more injection pumps 34 for injecting additional liquid fertilizing compositions into the liquid stream. Thus, the system 10 preferably allows for the production of a variety of different formulations of liquid fertilizer solutions for various fertilizing applications.

For instance, the system 10 may be utilized to produce a liquid fertilizer composition having desired nitrogen-phosphorus-potassium (N—P—K) values by adding various plant nutrients through the nutrient feed line system 30. In a preferred embodiment, the system 10 may also be configured to add additional compounds to a liquid fertilizer, such as chelation agents through the injection pumps 34 or solid fertilizing compounds, such as ammonium nitrate, ammonium polyphosphate, calcium, or lime, through the eductor injection system 32. During or after formulation of the liquid fertilizer, the circulation pump 28 may be used to circulate the liquid fertilizer stream and help to mix the various components of the stream. In a preferred embodiment, the circulation pump 28 may be used to circulate the liquid fertilizer stream through a static mixer 16 to further aid mixing of the stream, as well as through a high shear pump 14 downstream of the static mixer 16 for further mixing and particle size reduction, particularly of solid fertilizer compounds injected into the liquid stream. All nutrients and other components of the liquid fertilizer are preferably added to the liquid stream before running the liquid fertilizer through the high shear pump 14. The system 10 preferably includes a recirculation line 26 for recirculating the liquid stream through the high shear pump 14 back to the mixing tank 12. The system may include various instruments, which may preferably be installed on the recirculation line 26, to measure properties of the liquid stream, such as pH and dissolved oxygen. The liquid stream may be recirculated as necessary to formulate the liquid fertilizer before the addition of nano-bubbles to the liquid stream. The formulated liquid fertilizer may also be optionally run through one or more filters, such as 150 mesh bag filters, to remove any material not in solution before the addition of nano-bubbles.

The system 10 includes a nano-bubble generator 18 for transferring nano-bubbles into the liquid fertilizer stream. The liquid fertilizer stream is preferably conveyed through the nano-bubble generator 18 after flowing through the shear pump 14 and as the final step of the production process before final packaging of the liquid fertilizer for an end user. The addition of nano-bubbles to the liquid stream by flowing the liquid stream through the nano-bubble generator 18 is preferably the final step of the production process so as to maximize the nano-bubble concentration in the liquid fertilizer composition. Performing other processes on the liquid stream, such as running the liquid stream through the high shear pump 14, after the addition of nano-bubbles may decrease the concentration of nano-bubbles in the final product. Thus, addition of nano-bubbles in the final step maximizes both nano-bubble concentration and also the time in which nano-bubbles will remain in suspension in the liquid, which allows time for the product to be transported to the end user and for an adequate shelf life before use. The neutral buoyancy and negative surface charge of the nano-bubbles typically allows the nano-bubbles to remain in suspension for months. Thus, the liquid fertilizer composition will retain its efficacy for a longer period of time when nano-bubble infusion is the final step before final packaging.

As shown in FIG. 1, the nano-bubble generator 18 may preferably be arranged in parallel with the high shear pump 14. In this arrangement, the liquid fertilizer stream may be recirculated through the high shear pump 14 until all components are sufficiently mixed into a homogenous solution, at which point the stream may be conveyed through the nano-bubble generator 18 using the circulation pump 28. As the liquid fertilizer stream flows through the nano-bubble generator 18, nano-bubbles are transferred into the liquid stream such that the liquid becomes infused with nano-bubbles that are dispersed throughout the liquid. In other embodiments, the nano-bubble generator 18 may be arranged in series with the high shear pump 14, preferably downstream of the pump 14. The liquid stream may be conveyed through the nano-bubble generator 18 only once before packaging or may make multiple passes through the nano-bubble generator 18 using the recirculation line 26 and bypassing the high shear pump 14 to increase the concentration of nano-bubbles in the liquid. The dissolved oxygen meter or other instruments may be utilized to measure the gas content of the liquid stream to reach a desired nano-bubble concentration in the liquid fertilizer composition before transferring the liquid to final packaging. The system 10 may optionally include additional mixing tanks 12 for transferring different formulations of fertilizer between tanks for maximum flexibility in mixing and formulating fertilizers. It should be understood that the system 10 shown in FIG. 1 is an illustrative system 10 that may be utilized to produce a liquid fertilizer composition with nano-bubbles and that the system may have different configurations of the system components and still fall within the scope of the present disclosure.

Once transferred into the liquid fertilizer, the dissolved nano-bubbles preferably have a mean diameter of less than 500 nm, and more preferably a mean diameter less than 200 nm. In general, the smaller the diameter of the nano-bubbles, the greater the efficacy of the liquid fertilizer composition. In a preferred embodiment, the nano-bubble generator 18 may produce nano-bubbles having a mean diameter of less than 100 nm. In trials testing liquid fertilizers infused with nano-bubbles, a nano-bubble generator 18 sold under the trademark XTBi™ Nanobubble Generator by Moleaer® Inc. and having a maximum liquid flow rate of 500 gallons per minute (gpm) was utilized to add nano-bubbles to various liquid fertilizers. This model of nano-bubble generator generally produces nano-bubbles having a mean diameter of smaller than 100 nm and was used in all experimental trials discussed herein. When adding compressed ambient air to a liquid fertilizer in a single pass through the nano-bubble generator 18, preferably at least 2 milliliters of molecular oxygen ($O_2$) may be added per liter of liquid fertilizer, depending on the properties of the specific liquid carrier. In production of various formulations of liquid fertilizer compositions using the nano-bubble generator 18, a single pass with ambient air generally resulted in an increase in oxygen concentration of about 2-4 parts per million (ppm) oxygen by volume, depending on the liquid carrier, and multiple passes with ambient air resulted in an increase in oxygen concentration of up to 8 ppm by volume by recirculating the liquid stream through the nano-bubble generator 18. Using a 2,000 gallon mixing tank 12, an increase in oxygen concentration in the liquid fertilizer stream of 8 ppm was achieved by recirculating the liquid fertilizer about three to four times through the nano-bubble generator 18 using compressed air as the gas source 20, depending on the liquid properties and flow rate. When adding pure oxygen rather than air, preferably up to 10 milliliters of molecular oxygen may be added per liter of liquid fertilizer in a single pass through the nano-bubble generator 18.

In one trial run to produce liquid fertilizer infused with nano-bubbles, the nano-bubble generator 18 was used to transfer oxygen and nitrogen nano-bubbles from a source of ambient compressed air 20. The nano-bubbles were dissolved into a 30-0-0 liquid nitrogen fertilizer sold under the trademark Nitamin® by Koch Agronomic Services, LLC, which contained 12% urea and 18% other water-soluble nitrogen compounds in an aqueous solution. The liquid fertilizer was tested using a dissolved oxygen meter before and after infusion with nano-bubbles. Before flowing the liquid fertilizer through the nano-bubble generator 18, the liquid fertilizer had a dissolved oxygen concentration of 0.86 ppm and a dissolved oxygen saturation level of 11.1% at 28 degrees Celsius. After flowing the liquid fertilizer through the nano-bubble generator 18 in a single pass to transfer air into the liquid, the liquid fertilizer had a dissolved oxygen concentration of 6.2 ppm and a dissolved oxygen saturation level of 78.8% at 28 degrees Celsius.

Although smaller nano-bubbles are preferable, the presence of some micro-bubbles and/or ultrafine bubbles may confer some benefits to the liquid fertilizer, although larger bubbles, and particularly coarse bubbles, are likely to come out of solution at a faster rate and thus reduce the dissolved gas concentration, thereby minimizing the efficacy of the liquid fertilizer composition compared to the addition of only bubbles within the size range of nano-bubbles. In a preferred embodiment, after the addition of nano-bubbles to the liquid stream, the liquid fertilizer has greater than one billion nano-bubbles per milliliter of liquid fertilizer dispersed in the liquid fertilizer. In a preferred embodiment, the nano-bubble generator 18 may be designed for a liquid fertilizer flow rate of up to 500 gpm, and optionally up to 1,000 gpm, and a gas flow rate of up to 80 cubic feet per hour at a pressure of 100 psig.

Once the liquid fertilizer composition with the nano-bubbles dispersed therein has been produced, the liquid fertilizer may be applied to soil in which crops are grown to enhance plant growth. In a preferred embodiment, the liquid is applied to the surface of the soil, though the liquid may alternatively be applied subsurface. To evaluate the efficacy of the liquid fertilizer with nano-bubbles, several trials were run on various crops with various types of liquid fertilizers treated to include dissolved nano-bubbles. In all of the trials, a compressed air tank was the gas source 20 from which gas was transferred into the liquid fertilizer in the nano-bubble generator 18. In addition, in all of the trials discussed below, a control plot adjacent to an experimental plot was treated with the same volume of fertilizer applied in the same manner under the same conditions. The only variable between the experimental and control plots was that the control plots were treated with a standard liquid fertilizer without the addition of nano-bubbles, and the experimental plots were treated with the same fertilizer but after infusion with nano-bubbles from a compressed air source. The results are summarized below.

Corn Trials

Two trials were conducted on fields of corn located in the state of Georgia. Both trials utilized a liquid nitrogen fertilizer sold under the trademark 19-E' by R. W. Griffin Feed Seed and Fertilizer, Inc. The nitrogen fertilizer contains 19% total nitrogen, including ammonium nitrate and sodium nitrate in an aqueous solution. The solution may contain 35%-50% ammonium nitrate and 15%-35% sodium nitrate by weight. In both trials, an experimental plot of corn and an identical adjacent control plot of identical corn were both treated with fertilizer from the same batch of commercially available liquid nitrogen fertilizer. In the experimental plot, the nitrogen fertilizer was first treated with ambient compressed air to add nano-bubbles of oxygen and nitrogen before application to the experimental plot. In the control plot, fertilizer from the same batch of liquid nitrogen fertilizer was utilized to treat the control plot, but the fertilizer was not infused with nano-bubbles.

In the first trial, a 20 acre field of corn was treated with standard nitrogen fertilizer without nano-bubbles, and an adjacent 20 acre field of corn was treated with the same nitrogen fertilizer but with nano-bubbles infused into the liquid. The field treated with the nano-bubble fertilizer had an increase in yield of 8 additional bushels of corn per acre compared to the field treated with the standard nitrogen fertilizer.

The second trial was conducted on a different plot than the first trial, but the same protocol was used. A 20 acre field of corn was treated with standard nitrogen fertilizer without nano-bubbles, and an adjacent 20 acre field of corn was treated with fertilizer from the same batch of nitrogen fertilizer but with nano-bubbles dispersed therein. In this trial, the combined 40 acres had less fertile soil than the combined 40 acres in the first trial. In this case, the field treated with the nano-bubble nitrogen fertilizer had an increase in yield of 29 additional bushels of corn per acre compared to the field treated with standard nitrogen fertilizer.

Cotton Trial

A single cotton trial was conducted, also in Georgia, utilizing the same commercially available liquid nitrogen fertilizer as the corn trials. As such, a control plot was treated with the standard nitrogen fertilizer, and an adjacent experimental plot was treated with fertilizer from the same batch, but which was subsequently treated with compressed air to produce dissolved nano-bubbles, before application to the plot. The two fertilizers were applied to adjacent fields of cotton having identical cotton grown in both fields. In this trial, the cotton field treated with the nano-bubble infused fertilizer had an increase in yield of 128 pounds of cotton per acre compared to the adjacent control field, and a noticeable difference in plant color and disease pressure was observed on the cotton field treated with the nano-bubble fertilizer as compared to the field treated with the standard liquid fertilizer.

Sugarcane Trial

A single sugarcane trial was conducted in the state of Florida with a commercially available 11-37-0 liquid ammonium polyphosphate fertilizer produced by Nutrien® Ltd. In this fertilizer, approximately 72% of the total phosphorus content is in the form of polyphosphate. This fertilizer also contains small amounts of various micronutrients, including iron, aluminum, magnesium, fluoride, sulfate, and calcium. The liquid fertilizer was treated with ambient compressed air to add nano-bubbles of oxygen and nitrogen. In this trial, adjacent plots were treated with identical sugarcane grown on both plots. The control plot was treated with the standard commercially available formulation of the ammonium polyphosphate fertilizer, and the experimental plot was treated with the same batch of ammonium polyphosphate fertilizer, which was first infused with nano-bubbles before application. Compared to the acreage treated with the standard fertilizer, the sugarcane on the acreage treated with the nano-bubble fertilizer was observed to have established faster and have more plant vigor.

Turf Grass Trial

Two turf grass trials were conducted with Tifway 419 Bermuda turf grass and a liquid 2-10-7 fertilizer containing urea and monopotassium phosphate in an aqueous solution. The trials utilized a single batch of liquid fertilizer, some of which was untreated and some of which was treated with ambient compressed air to add nano-bubbles of oxygen and nitrogen. In these trials, the treated and untreated fertilizers were both tested for dissolved oxygen content. The untreated fertilizer had a dissolved oxygen content of 2.36 ppm by volume, while the fertilizer treated with nano-bubbles had a dissolved oxygen content of 5.36 ppm by volume. In each of the trials, both untreated fertilizer and fertilizer treated with infused nano-bubbles were applied to adjacent plots with identical turf grass grown on both plots. In both trials, the plots to which the nano-bubble fertilizer was applied were observed to have significantly more plant vigor and root development compared to the plots to which the untreated fertilizer was applied.

In all of the above trials, even an increase in dissolved oxygen content of 2-4 ppm by volume resulted in a significant increase in the efficacy of liquid fertilizers and their usefulness in soil as determined by both a measured increase in crop yield and by observable plant qualities. The nano-bubbles, and particularly oxygen nano-bubbles, dissolved in the liquid fertilizer compositions maximize the efficacy of the fertilizer to further enhance plant growth and thus maximize crop yield. Nano-bubble treatment may also be used to increase the efficacy and efficiency of liquid formulations of soil amendments, adjuvants, micronutrient compositions, or other similar growth-enhancing compositions. The nano-bubbles of oxygen or other gases dispersed in the liquid fertilizer help to more effectively metabolize plant nutrients, generate microbial activity, and facilitate other processes necessary for efficient and effective plant growth. Nano-bubbles also create an environment more conducive to plant nutrient uptake in plants and soils. Nano-bubbles additionally reduce the viscosity of the liquid carrier, which may contain suspended or dissolved fertilizer particles. Reducing the viscosity of the liquid carrier helps with liquid handling, fertilizer application to soils, plant uptake, and soil mobility. Thus, liquid fertilizer compositions having nano-bubbles dispersed therein provide a variety of benefits that enhance plant growth as compared to conventional liquid fertilizers.

It is understood that versions of the present disclosure may come in different forms and embodiments. Additionally, it is understood that one of skill in the art would appreciate these various forms and embodiments as falling within the scope of the invention as disclosed herein.

What is claimed is:

1. A method of forming a packaged liquid fertilizer containing nano-bubbles, said method comprising the steps of:
   providing a liquid fertilizer;
   providing a nano-bubble generator;
   transferring nano-bubbles into the liquid fertilizer using the nano-bubble generator so that the nano-bubbles are dispersed in the liquid fertilizer, wherein the nanobubbles have a mean diameter of less than 500 nanometers;
   packaging the liquid fertilizer containing nano-bubbles for storage and transport, the packaged liquid fertilizer containing nano-bubbles constructed and arranged to maintain the nano-bubbles in suspension for at least thirty days;
   applying the liquid fertilizer having the nano-bubbles dispersed therein to soil in which crops are grown.

2. The method of claim 1, wherein the step of transferring nano-bubbles into the liquid fertilizer comprises transferring oxygen and nitrogen nano-bubbles from a compressed air source.

3. The method of claim 1, wherein the mean diameter of the nano-bubbles is less than 200 nanometers.

4. The method of claim 1, wherein the nano-bubbles comprise molecular oxygen.

5. The method of claim 1, wherein the nano-bubbles comprise ozone.

6. The method of claim 1, wherein the liquid fertilizer has greater than one billion nanobubbles per milliliter of liquid fertilizer dispersed in the liquid fertilizer.

7. The method of claim 1, wherein the step of applying the liquid fertilizer having the nano-bubbles dispersed therein to soil comprises applying the liquid fertilizer to the surface of the soil.

8. A method of packaging a liquid fertilizer and nano-bubble solution for storage comprising the steps of:
   providing a liquid fertilizer;
   providing a nano-bubble generator; and
   transferring nano-bubbles into the liquid fertilizer using the nano-bubble generator so that the nano-bubbles are dispersed in the liquid fertilizer, wherein the nanobubbles have a mean diameter of less than 500 nanometers;
   packaging the liquid fertilizer nano-bubble solution mixture;
   storing the packaged liquid fertilizer nano-bubble solution, wherein the liquid fertilizer nano-bubble solution remains a stable solution for at least thirty days.

9. The method of claim 8, wherein the step of transferring nano-bubbles into the liquid fertilizer comprises transferring oxygen and nitrogen nano-bubbles from a compressed air source.

10. The method of claim 8, wherein the step of transferring nano-bubbles into the liquid fertilizer comprises flowing the liquid fertilizer through the nano-bubble generator, and wherein flowing the liquid fertilizer through the nano-bubble generator is the final step of the method before final packaging of the liquid fertilizer.

11. The method of claim 8, wherein the step of providing the liquid fertilizer comprises running the liquid fertilizer through a high shear pump before transferring the nanobubbles into the liquid fertilizer.

12. The method of claim 11, wherein the step of providing the liquid fertilizer further comprises adding plant nutrients to a liquid carrier before running the liquid fertilizer through the high shear pump.

13. The method of claim 8, wherein the mean diameter of the nano-bubbles is less than 200 nanometers.

14. The method of claim 8, wherein the nano-bubbles comprise molecular oxygen.

15. The method of claim 8, wherein the nano-bubbles comprise ozone.

16. The method of claim 8, wherein the liquid fertilizer has greater than one billion nanobubbles per milliliter of liquid fertilizer dispersed in the liquid fertilizer.

17. A storable liquid fertilizer solution comprising:
- a liquid fertilizer mixture including water as a carrier and at least one other plant growth nutrient, the liquid fertilizer mixture having nano-bubbles dispersed in solution therein forming a liquid fertilizer solution, wherein the nano-bubbles have a mean diameter of less than 500 nanometers;
- packaging for containing the liquid fertilizer solution, the packaging constructed and arranged to allow storage of the liquid fertilizer solution for at least 10 days, wherein the liquid fertilizer solution remains stable for the duration of storage.

18. The storable liquid fertilizer of claim 17, wherein the mean diameter of the nano-bubbles is less than 200 nanometers.

19. The storable liquid fertilizer of claim 17, wherein the nano-bubbles comprise molecular oxygen.

20. The storable liquid fertilizer of claim 17, wherein the nano-bubbles comprise ozone.

\* \* \* \* \*